(12) United States Patent
LeBlanc et al.

(10) Patent No.: US 9,638,201 B2
(45) Date of Patent: May 2, 2017

(54) MACHINED AERODYNAMIC INTERCOMPRESSOR BLEED PORTS

(75) Inventors: Ryan Edward LeBlanc, Glastonbury, CT (US); Kevin J. Cummings, West Hartford, CT (US); Barry M. Ford, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 275 days.

(21) Appl. No.: 13/527,887

(22) Filed: Jun. 20, 2012

(65) Prior Publication Data
US 2013/0340440 A1    Dec. 26, 2013

(51) Int. Cl.
| | |
|---|---|
| F02C 9/18 | (2006.01) |
| F04D 27/02 | (2006.01) |
| F02C 6/08 | (2006.01) |
| F04D 29/52 | (2006.01) |
| F04D 29/02 | (2006.01) |

(52) U.S. Cl.
CPC ............ F04D 27/0215 (2013.01); F02C 6/08 (2013.01); F04D 27/023 (2013.01); F04D 29/023 (2013.01); F04D 29/522 (2013.01); F02C 9/18 (2013.01); F05D 2230/10 (2013.01); Y02T 50/671 (2013.01); Y10T 29/49234 (2015.01)

(58) Field of Classification Search
CPC ...... F02C 6/08; F02C 9/18; F02C 9/52; F04D 27/0207; F04D 27/0215; F04D 27/023; F04D 29/023; F04D 29/522; F02K 3/02; F05D 2230/10; Y02T 50/671; Y10T 29/49234

USPC .......................................... 60/782, 785, 795
See application file for complete search history.

(56) References Cited

U.S. PATENT DOCUMENTS

| | | | |
|---|---|---|---|
| 4,463,552 A | | 8/1984 | Monhardt et al. |
| 5,155,993 A | * | 10/1992 | Baughman ............ F04D 27/023 60/226.1 |
| 5,279,109 A | | 1/1994 | Liu et al. |
| 5,380,151 A | | 1/1995 | Kostka et al. |
| 5,458,343 A | | 10/1995 | Dornfeld et al. |
| 5,649,419 A | | 7/1997 | Schaut |

(Continued)

FOREIGN PATENT DOCUMENTS

| | | |
|---|---|---|
| EP | 1329615 A2 | 7/2003 |
| EP | 1486678 A2 | 12/2004 |
| EP | 1978209 A2 | 10/2008 |

OTHER PUBLICATIONS

International Search Report and Written Opinion for related International Application No. PCT/US2013/036749; report dated Jul. 18, 2013.

(Continued)

*Primary Examiner* — Ehud Gartenberg
*Assistant Examiner* — Jason H Duger
(74) *Attorney, Agent, or Firm* — Cantor Colburn LLP (57) ABSTRACT

An air bleed system for a jet engine is provided. The air bleed system is located in the low pressure compressor chamber and comprises a movable bleed valve and a stationary, annular bleed case having a forward section and an aft section and ligaments connecting the two sections and providing structural support to the bleed case. The ligaments are machined from the bleed case into an aerodynamic shape that maximizes the flow of air through the bleed ports.

12 Claims, 8 Drawing Sheets

(56) References Cited

U.S. PATENT DOCUMENTS

| | | | |
|---|---|---|---|
| 6,086,326 | A | 7/2000 | Honda et al. |
| 6,106,227 | A * | 8/2000 | Honda et al. ............... 415/145 |
| 6,161,839 | A * | 12/2000 | Walton et al. ............... 277/590 |
| 6,802,691 | B2 | 10/2004 | Chlus |
| 6,899,513 | B2 | 5/2005 | Eleftheriou |
| 7,624,581 | B2 | 12/2009 | Moniz |
| 7,785,066 | B2 | 8/2010 | Bil et al. |
| 7,850,419 | B2 | 12/2010 | Vrljes et al. |
| 2005/0106009 | A1 | 5/2005 | Cummings et al. |
| 2008/0115504 | A1 * | 5/2008 | Martensson ............. F02C 3/13 60/785 |
| 2009/0188257 | A1 * | 7/2009 | Kirby ............................ 60/785 |
| 2009/0301102 | A1 * | 12/2009 | Clemen et al. ............... 60/785 |
| 2011/0016877 | A1 * | 1/2011 | Nichols et al. ............... 60/785 |

OTHER PUBLICATIONS

European Search Report for EP Application No. 13807208.7 dated May 13, 2016.

* cited by examiner

MACHINED AERODYNAMIC INTERCOMPRESSOR BLEED PORTS

TECHNICAL FIELD

The subject matter of the present disclosure relates generally to gas turbine engines. More particularly, the subject matter of the present disclosure relates to an improved system for bleeding air from a gas turbine engine low pressure compressor chamber and a method of making same.

BACKGROUND

Gas turbine engines such as those used on jet aircraft generally comprise an air inlet, a single or multi-stage compressor chamber, a combustion chamber aft (downstream) of the compressor chamber, a turbine and an exhaust nozzle. Air entering the inlet flows axially through the compressor chamber and into the combustion chamber where it provides oxygen for fuel ignition. As the air passes through the various stages of the compressor its pressure increases. Under certain conditions, such as when the engine is throttled back or during start up, the amount of air required in the combustion chamber is less than that flowing through the compressor chamber. Under these conditions an engine surge may occur, endangering the operation of the aircraft. To mitigate or eliminate engine surges, an air bleed system may be provided within the compression section to temporarily bleed off air and reduce air flow entering the combustion chamber.

Thus there is a need for an air bleed system that includes an annular bleed case with integral structural ligaments that not only provide structural support to the bleed case, but also are aerodynamically designed and oriented with respect to the air flow coming off the compressor rotor to maximize air flow through the bleed ports and reduce pressure loss across the system.

There also is a need for an improved air bleed system that is machined rather than cast for lighter weight and to provide ligaments having a unique geometry and greater strength.

There is also a need for an improved air bleed system that not only directs air out of the engine cavity but also can withstand major engine case loads and support the engine core.

SUMMARY

The present invention achieves these objectives by providing an intercompressor air bleed system for a jet engine. The air bleed system comprises a ring-shaped, forged aluminum bleed case having multiple circumferentially arranged bleed ports configured at a specific angle to optimize the flow of air through the ports with minimal blockage. The bleed case comprises ligaments (structural cross members that connect the forward and aft ends of the case) having angled end faces that substantially align with the swirl of air coming off the compressor rotor. The annular bleed case is positioned symmetrically around the engine longitudinal axis so that it circumscribes the compressor air flow path.

The jet engine may comprise an air intake port, a low pressure compressor chamber located downstream of the air intake port, and a high pressure compressor chamber located downstream of the low pressure compressor chamber. The low pressure compressor chamber may have a forward portion and an aft portion. The air bleed system may be located in the aft portion of the low pressure compressor chamber. More particularly, the air bleed system may be located longitudinally behind a rotating low pressure compressor blade.

In one illustrative embodiment the system comprises a stationary, annular bleed case having a forward section and an aft section and ligaments connecting the two sections. The forward section, the aft section and the ligaments define a series of bleed ports circumferentially disposed around the bleed case and through which air can be bled from the engine core inlet and into a fan duct. A bleed valve may be operably connected to the bleed case to open and close the bleed ports. The ligaments provide structural support for the bleed case and have an aerodynamic shape that maximizes the flow of air through the bleed ports.

Each ligament may have an arced top face on a fan duct facing side, an arced bottom face on an engine core inlet facing side, a first end face extending from the top face to the bottom face and a second end face opposite the first end face. The first and second end faces may be angled to match the angle of the swirling air coming off the low pressure compressor blades. For example, the first and second end faces of each ligament may define planes that are substantially parallel to the flow of the swirling air coming off the low pressure compressor. More particularly, the first and second end faces may each form an acute included angle of about thirty-six degrees with a longitudinal plane (P) coincident with (occupying the same space as) the engine longitudinal axis (A).

The first face and the bottom face may intersect at a first lower edge. Likewise, the second face and the bottom face may intersect at a second lower edge. To render the ligaments even more aerodynamic, both the first and second lower edges may be rounded. In one embodiment the ratio of curvature of the first lower edge to the second lower edge is about 0.125 to 1.00, respectively.

The bleed valve may comprise an annular body carrying a first set of seals and a second set of seals arranged circumferentially around the annular body. The bleed valve may be movable between a closed position (in which first and second sets of seals engage the bleed case to close the bleed ports), and an open position (in which the first and second sets of seals are disengaged from the bleed case to allow air to flow through the bleed ports). The bleed valve may be mounted to the bleed case.

More particularly, the bleed valve may be positioned upstream of the bleed case and may be movable in an axial direction between the closed position and the open position. The bleed valve is normally in the closed position and is movable to the open position when the amount of air required to the combustion chamber is less that that flowing through the low pressure compressor chamber.

The bleed ports may angled. That is, each bleed port may include an angled section and a radially extending section, where the angled section is oriented at an angle to a plane defined by the bleed case and the radially extending section is oriented in the same plane as a plane defined by the bleed case.

Similarly, each arced ligament may comprise an angled section and a radially extending section. The angled section may be oriented at an angle to a plane defined by the bleed case, while the radially extending section may be oriented co-planar to the plane defined by the bleed case.

A method of making a dual milled annular bleed case for a jet engine is also disclosed. The method may comprise the steps of providing a forged aluminum annular air bleed case having a forward section, an aft section and a continuous ligament connecting the two sections; milling out of the continuous ligament a plurality of spaced apart, circumferentially disposed radial bores from outboard the annular bleed case, each radial bore oriented co-planar to a plane defined by the annular bleed case; and milling out of the continuous ligament a corresponding number of angled bores from inboard the bleed case, each angled bore oriented at an angle to the plane defined by the annular bleed case. Each angled bore may meet or join a corresponding radial bore along a bend to form a bleed port through which air can be bled from the jet engine core. Each bend may be configured to minimize the impedance of air flow through each port.

During both milling steps the bores may be milled so that the dual milled annular bleed case comprises a plurality of circumferentially disposed ligaments in which each bleed port is defined by opposing faces of circumferentially adjacent ligaments. The opposing faces may be angled with respect to a longitudinal plane (P) coincident with the longitudinal axis (A) of the jet engine. More specifically, the opposing faces may define planes that form an included acute angle of about 36 degrees with the longitudinal plane coincident with the longitudinal axis.

BRIEF DESCRIPTION OF THE DRAWINGS

So that the manner in which the above recited concepts of the present disclosure may be understood in detail, a more particular description is provided by reference to the embodiments, which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

Broadly stated, the present invention is an improved air bleed system for a gas turbine engine having one or more compressor stages. The air bleed system may be located in the aft portion of the low pressure compressor chamber and comprises a movable bleed valve and a stationary, annular bleed case having a forward section and an aft section and ligaments connecting the two sections. The ligaments may be machined from the bleed case into an aerodynamic shape that provides structural support for the bleed case with minimal impeding of the air flow through the bleed ports.

Jet Engine Principles

A typical turbofan jet engine works by forcing compressed air into a combustion chamber where it is mixed with fuel and ignited so that the exhaust gases exit a downstream nozzle, thereby creating thrust.

Figure 1:
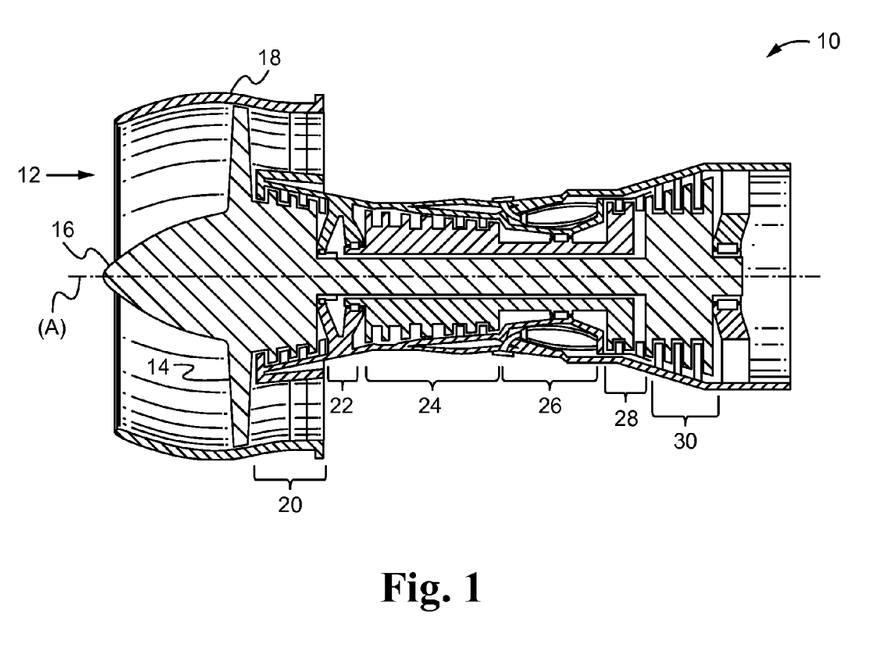
FIG. 1 is a longitudinal sectional view of an exemplary turbofan jet engine that may be equipped with the air bleed system of the present invention.

FIG. 1 is a longitudinal sectional view of an exemplary turbofan jet engine 10 that may be equipped with the air bleed system of the present invention. The engine 10 comprises an air intake port 12, a fan 14 mounted on a hub 16 near the air intake port 12 and surrounded by a fan case 18 which is mounted within an engine housing (not shown), a low pressure compressor (LPC) chamber 20, an intermediate section 22 aft of the LPC chamber 20, a high pressure compressor (HPC) chamber 24, a combustion chamber or combustor 26, high and low pressure turbines 28, 30 that provide rotational power to the fan 14 and compressor blades, and an exhaust outlet 32.

Figure 2:
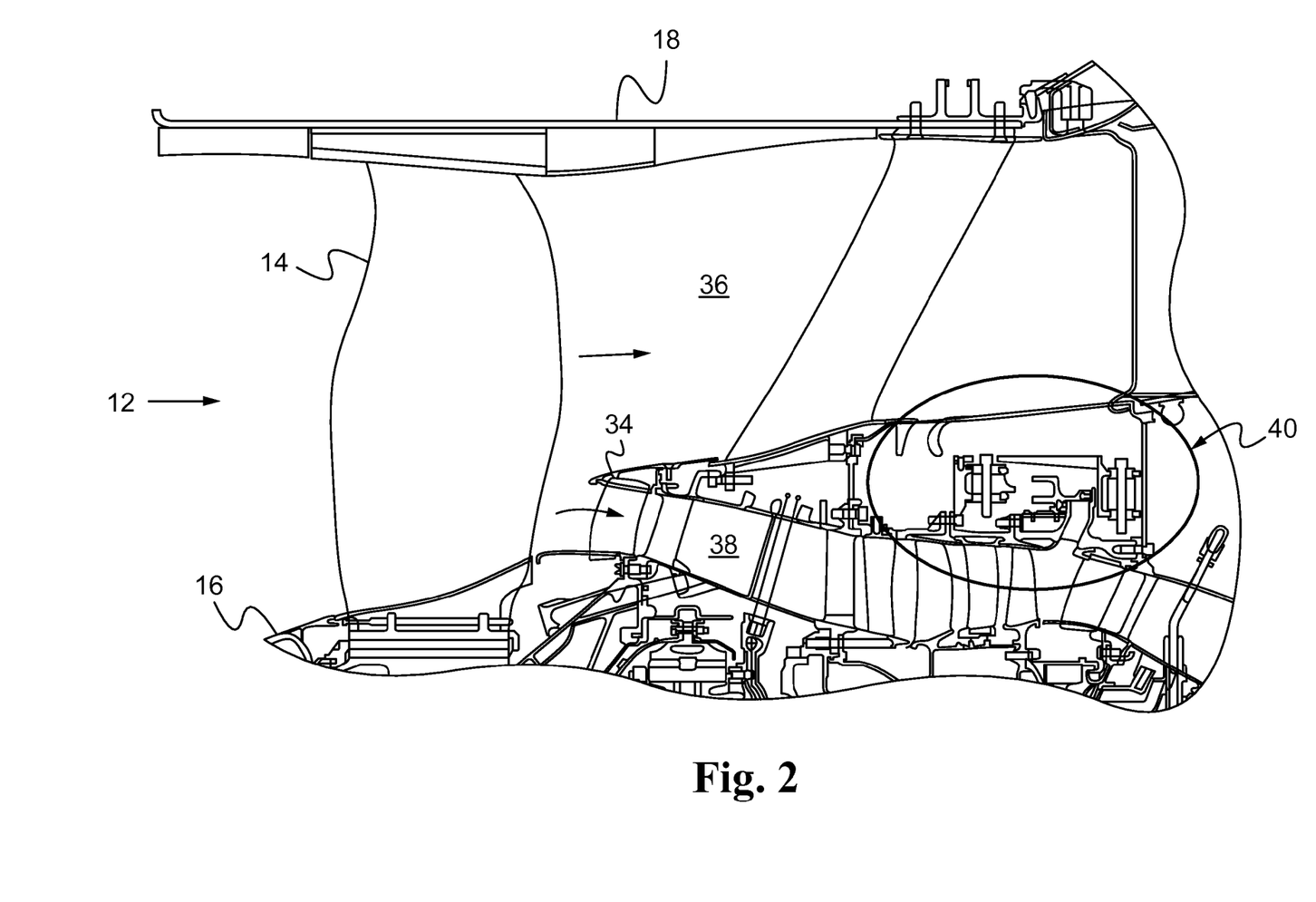
FIG. 2 is a cross sectional view of a portion of a turbofan jet engine similar to the one in FIG. 1, showing an air bleed system according to the present invention.

As best shown in FIG. 2, a stationary, annular shaped splitter 34 circumferentially disposed around the hub 16 and behind the fan 14 divides (channels) the air entering the air intake port 12 into either a relatively larger fan duct 36 outboard of the splitter 34 (away from the engine core), or into a relatively smaller engine core inlet 38 located inboard of the splitter 34. The air passing through the fan duct 36 bypasses the engine core and travels directly to the exhaust outlet 32 (FIG. 1) where it provides some of the engine thrust.

The air diverted by the splitter 34 into the engine core inlet 38 travels into the HPC chamber 24 where it undergoes further compression, then into the combustion chamber 26 where it is mixed with fuel to produce combustion gases which pass through the turbines 28, 30 and then exit through the exhaust nozzle 32 to provide the majority of the engine thrust.

Under certain conditions, such as when the engine is throttled back or during start up, the amount of air required in the combustion chamber 26 is less than that flowing through the engine core inlet 38. Under these conditions an engine surge may occur, endangering the operation of the aircraft. To mitigate or eliminate surges, an air bleed system 40 is provided within the LPC chamber 20 to bleed off air and temporarily reduce air flow entering the combustion chamber 26. For stability and operability, air passing through the engine core inlet 38 may be bled off within the LPC chamber 20 (at station 2.5) through air bleed port passageways 52 and out into the surrounding fan duct 36.

The Invention

The present invention is an air bleed system 40 for bleeding off air from the engine core inlet 38 into the fan duct 36 that increases bleed flow, minimizes or eliminates pressure loss across the air bleed system, and thus improves the stability of the low pressure compressor 20, and achieves these objectives within a narrow section of the engine (station 2.5). The air bleed system 40 preferably is located in front of the engine 10 in the aft portion of the LPC chamber 20 (at station 2.5) upstream of the intermediate section 22 and the HPC chamber 24.

FIG. 2 is a cross sectional view of a portion of a turbofan jet engine similar to the one in FIG. 1, showing an air bleed system 40 according to the present invention. The air bleed system 40 is shown in the LPC chamber 20 aft of the splitter 34 and is circumferentially disposed around the engine hub 16. The air bleed system 40 is normally closed during aircraft flight and is only opened when the amount of air required to the combustion chamber is less that that flowing through the compressor, for example, when the engine is throttled back or during start up.

Figure 3:
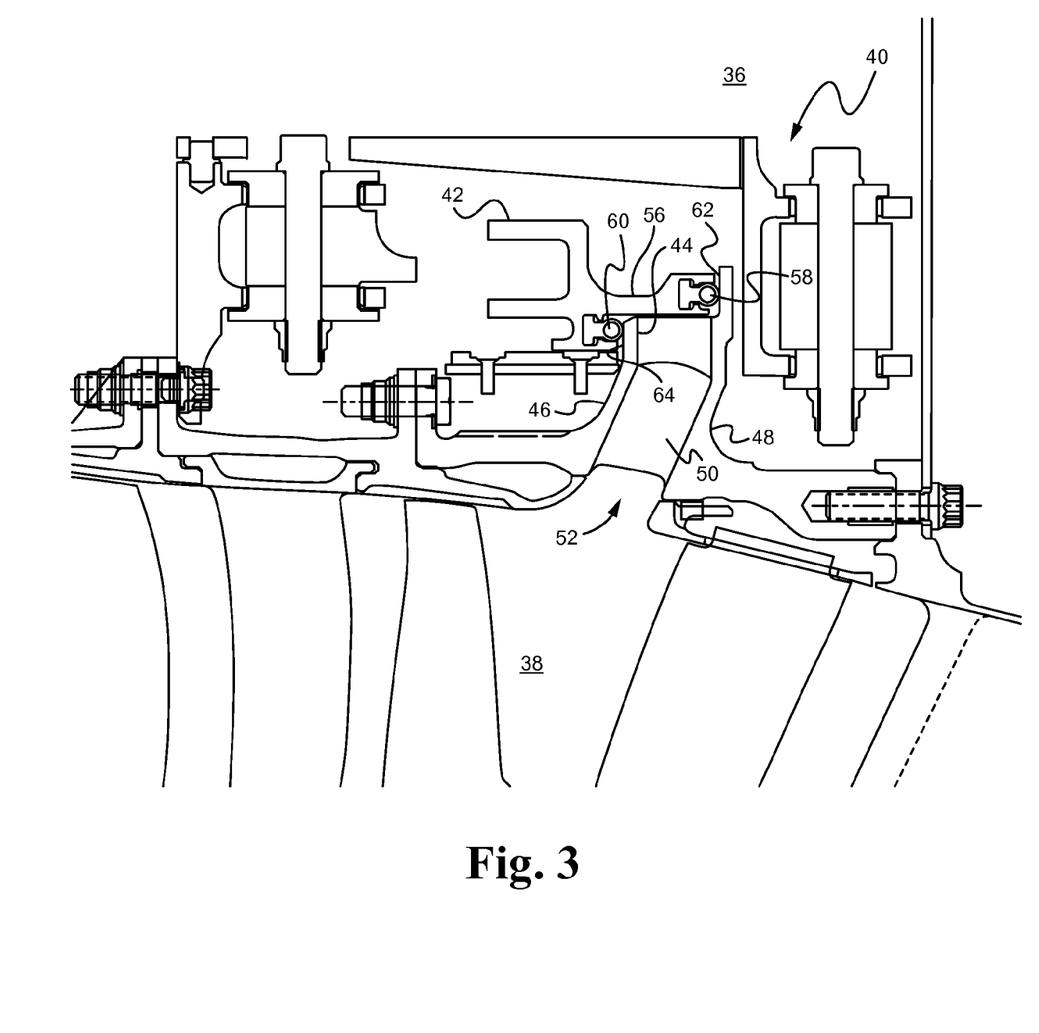
FIG. 3 is a close up cross sectional view of the air bleed system of FIG. 2 shown in the closed position.
Figure 4:
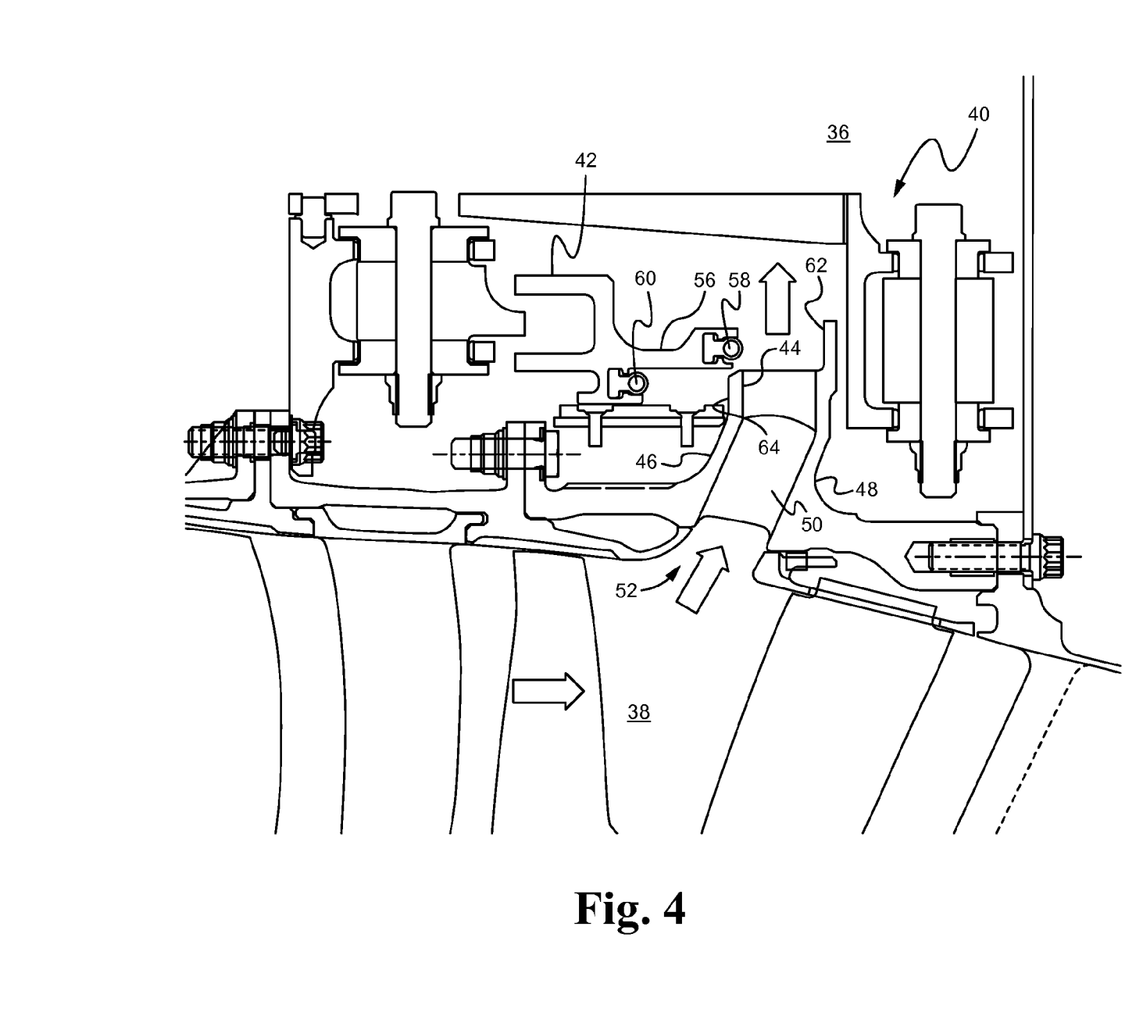
FIG. 4 is a close up cross sectional view of the air bleed system of FIG. 2 shown in the open position.

As perhaps best shown in FIGS. 3 and 4, the air bleed system 40 comprises a movable bleed valve 42 and a stationary, annular bleed case 44. The bleed valve 42 comprises an annular body 56 that carries a first set of seals (sealing segments) 58 and a second set of seals (sealing segments) 60. The multiple sealing segments 58, 60 are arranged circumferentially around the bleed valve body 56 (within the LPC chamber 20) to seal off every bleed port 52 simultaneously.

The bleed valve 42 is positioned upstream of the bleed case 44 and is movable via linkages 84 in an axial direction between a closed position shown in FIG. 3 in which the bleed valve 42 seals (closes off) the bleed ports 52, and an open position shown in FIG. 4, in which air can pass through the bleed ports 52 into the fan duct 36. In typical operation the bleed valve 42 will be closed.

When in the closed position shown in FIG. 3 the first set of seals 58 engages an inner wall 62 of the rearward section 48 of the bleed case 44 and the second set of seals 60 engages an outer wall 64 of the forward section 46 of the bleed case 44, thereby closing the bleed ports 52.

When in the open position shown in FIG. 4 the bleed valve 42 is pulled back, forward (upstream) of the bleed ports 52. The seals 58, 60 are disengaged from the sealing surfaces 62, 64, allowing air to be bled off the engine core inlet 38 and out into the fan duct 36. Air bled out of the low pressure compressor (via the air bleed ports 52) travels through louvers (not shown) and back into the fan duct air stream 36.

The bleed valve 42 is activated by a single actuator and both translates and rotates during operation. That is to say, the bleed valve 42 moves both in an axial direction and in a rotational manner during operation, similar to a threaded cap. This dual motion capability is made possible by a system of linkages 84 located outboard of the bleed ports 52 (FIG. 6).

Figure 5:
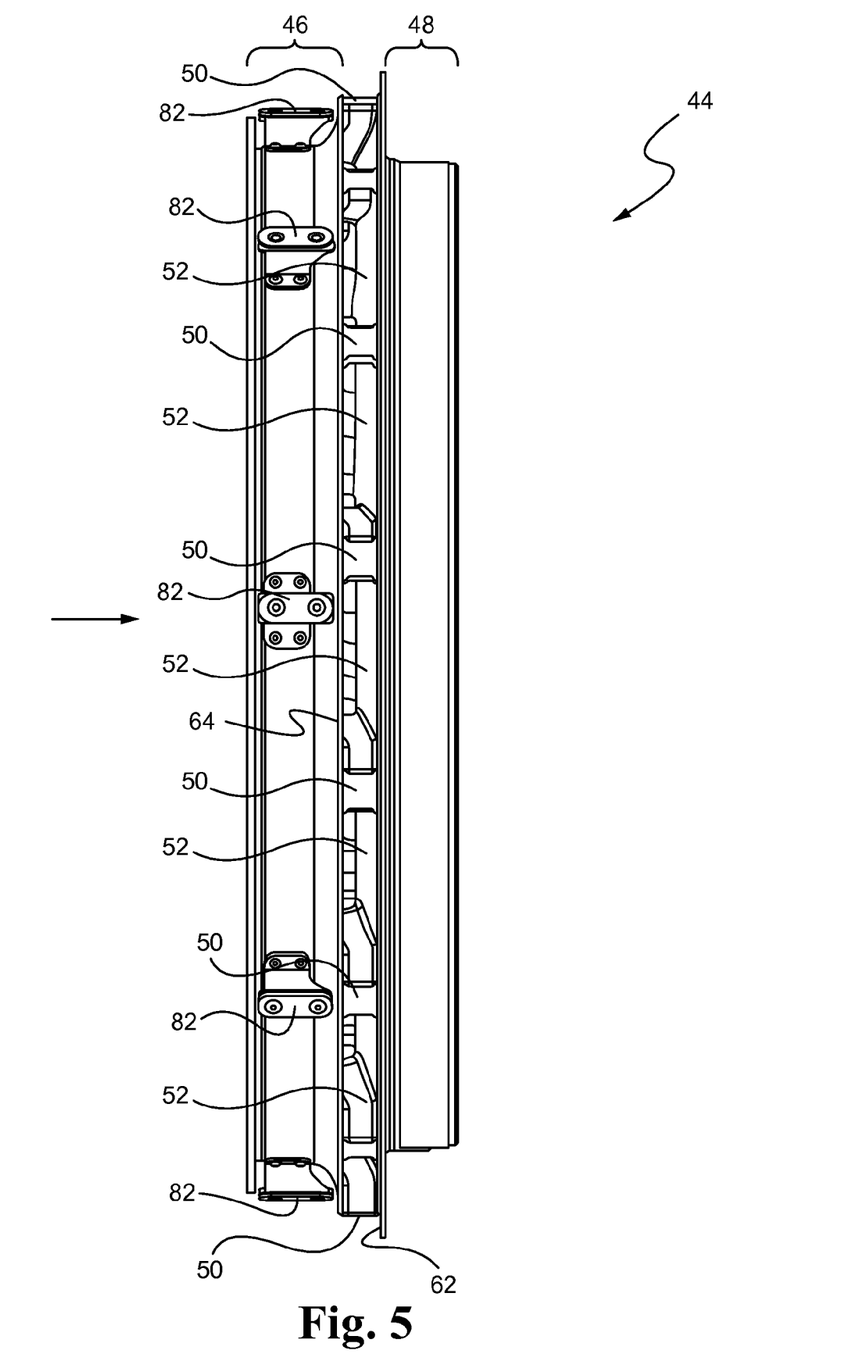
FIG. 5 is a side view of a bleed case, a main component of the air bleed system of FIG. 2.

FIG. 5 is a side view of a bleed case 44. The bleed case 44 has a forward section 46 and an aft section 48 and ligaments 50 connecting the two sections. The ligaments 50 provide structural support (by connecting the two sections 46, 48), but also incorporate a unique aerodynamic design as explained in detail below. The bleed case 44 is positioned symmetrically around the engine longitudinal axis (A) (indicated by the arrow in FIG. 5) so that it circumscribes the compressor air flow path. The bleed case 44 may comprise any suitable number of ligaments 50. Together the bleed case 44 and the ligaments 50 define a series of slots or bleed ports 52 circumferentially disposed around the bleed case 44 through which air can be bled from the engine core inlet 38 into the fan duct 36.

The number of ligaments 50 can vary, as can the total bleed area, defined as the cumulative areas of the bleed ports 52. In one embodiment of the invention having fifteen load carrying ligaments 50 for meeting backbone stiffness requirements, the total bleed area was 45 square inches.

Figure 6:
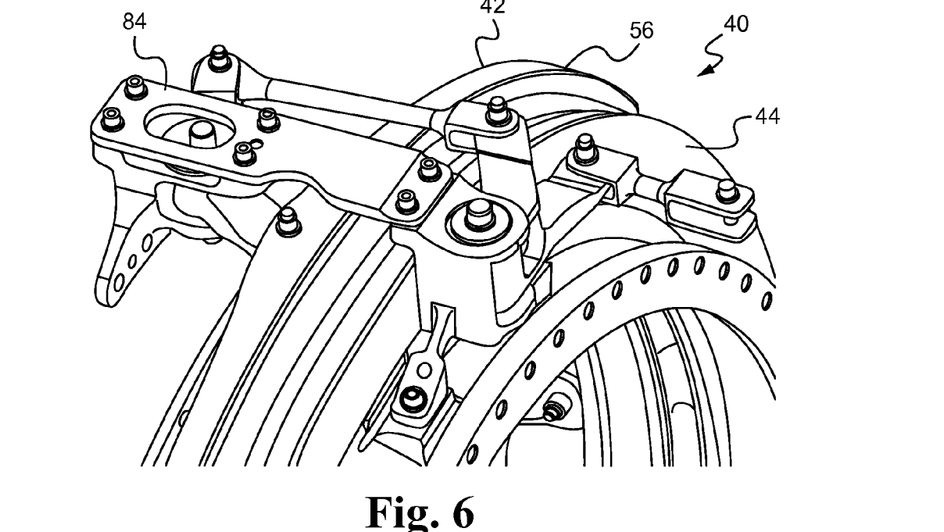
FIG. 6 is a partial, perspective view of the air bleed system of FIG. 2.

FIG. 6 is a partial, oblique view of the air bleed system of FIG. 2. The bleed valve 42 is shown in the closed position, overlaying the bleed ports 52 and obscuring them from view in this figure. The linkages 84 that enable the bleed valve to open and close are also shown. The linkages 84 are mountable to the flange on the case just forward of the bleed duct case 44.

Figure 7:
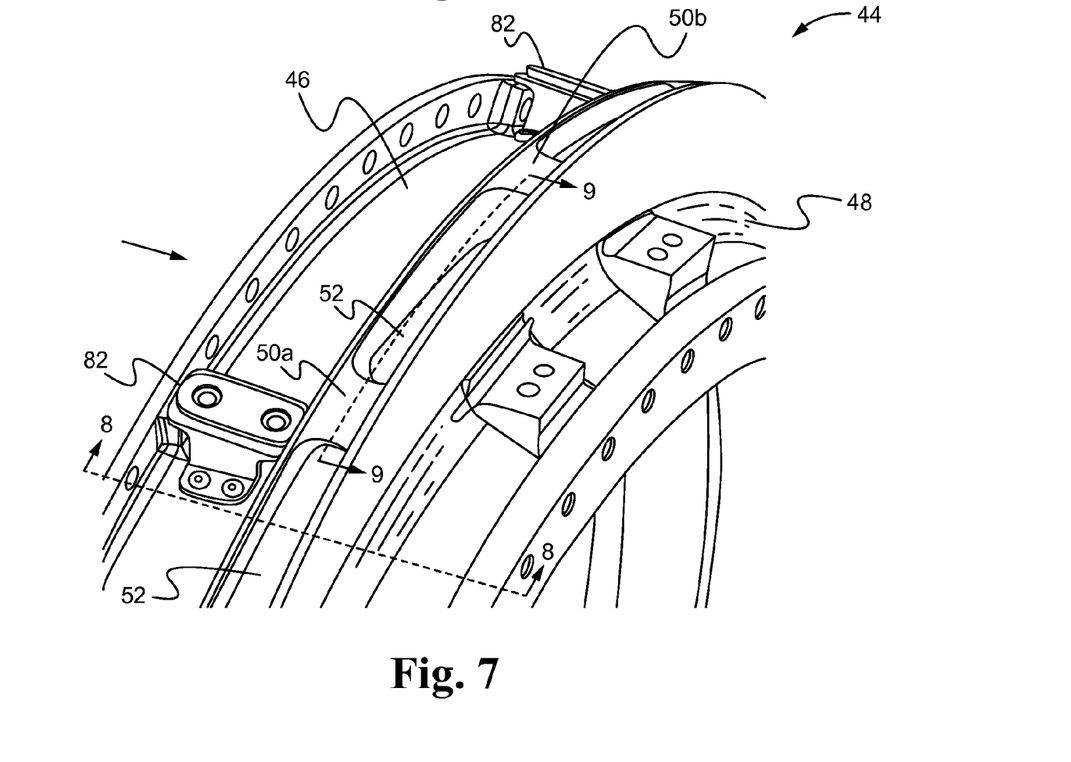
FIG. 7 is a partial, perspective view of the air bleed system of FIG. 2 with the bleed valve removed to provide a better view the bleed case.

FIG. 7 is a similar partial, oblique view of the air bleed system of FIG. 6, but with the bleed valve 42 and linkages 84 removed to better show the ligaments 50 and bleed ports 52. Two of the bearing pad supports 82 on which the linkages 84 are mounted may be seen in this view.

Ideally, there would be no ligaments 50 in the bleed case 44 to interrupt air flow. However, since the ligaments 50 are necessary to provide structural support to the bleed case 44, the bleed ports 52 and ligaments 50 of the present invention are machined and aerodynamically designed so that the air bleed system 40 bleeds off air from the low pressure compressor chamber 20 as cleanly as possible. That is, the ligaments 50 are designed to have minimal impact on the air flowing through the bleed ports 52.

Ligament Geometry

The air bleed system 40, and thus the bleed ports 52, is located directly behind a rotating low pressure compressor blade where the air is swirling around the engine hub. (In the illustrated embodiment, when viewed from the front of the engine 10, the air is swirling in a clockwise direction.) To accommodate this swirling effect, the ligaments 50 are milled so that their end faces (i.e. the surfaces facing the bleed ports 52) are approximately parallel to the flow of air coming off the LPC blade and moving through the bleed ports 52, as explained in more detail below.

Figure 8:
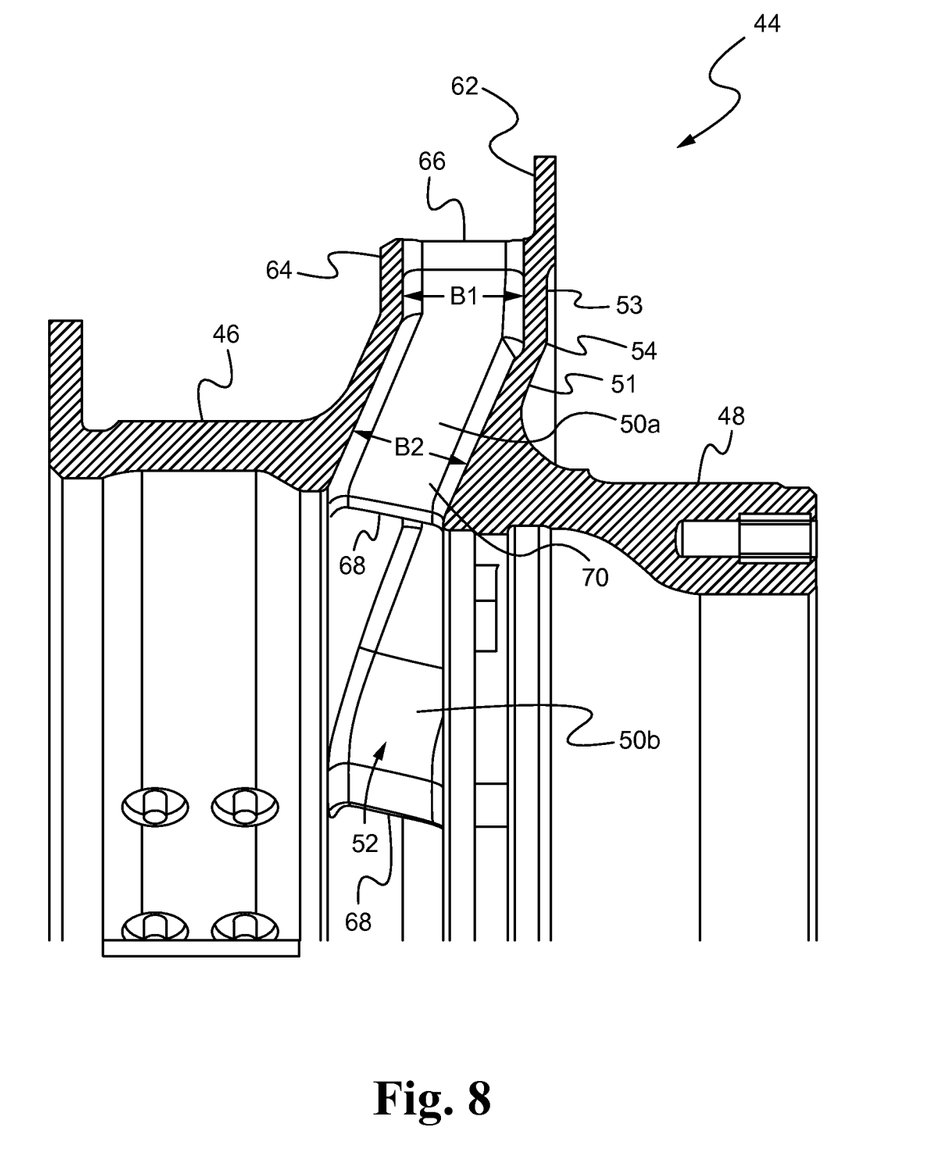
FIG. 8 is a cross sectional view of the air bleed system of FIG. 7 taken along line 8-8.

FIG. 8 is a cross sectional view of the bleed case 44 of FIG. 7 taken along line 8-8. From this view can be seen a first ligament 50a and, behind it, a partially obscured second ligament 50b. Between the first and second ligaments 50a, 50b is a bleed port 52 through which air can pass.

The bleed ports 52 have an angular shape, and comprise an angled section 51, i.e., a section oriented at angle to a plane defined by the bleed case 44, and a radially extending section 53 coplanar with the bleed case 44, joined at a bend 54. To generate this angular shape, a radial bore (B1) may be milled from the bleed case 44 from above (outboard the bleed case 44) and an angled bore (B2) may be milled from below (inboard the bleed case 44). This dual milling of the two bores (B1, B2) coming together at the bend 54 results in minimal waterfall effect, and thus minimal impeding of the air flow at the bend 54 of the bleed port 52.

It can also be seen from FIG. 8 that, since the ligaments 50 extend axially between the forward and aft sections 46, 48 of the bleed case 44 in both the angled section 51 and the radially extending section 53 of the air bleed case 44, the ligaments 50 themselves have an angular shape when viewed from the side. That is, like the bleed ports 52, the ligaments 50 also comprise an angled section and a radially extending section joined along a bend.

Figure 9:
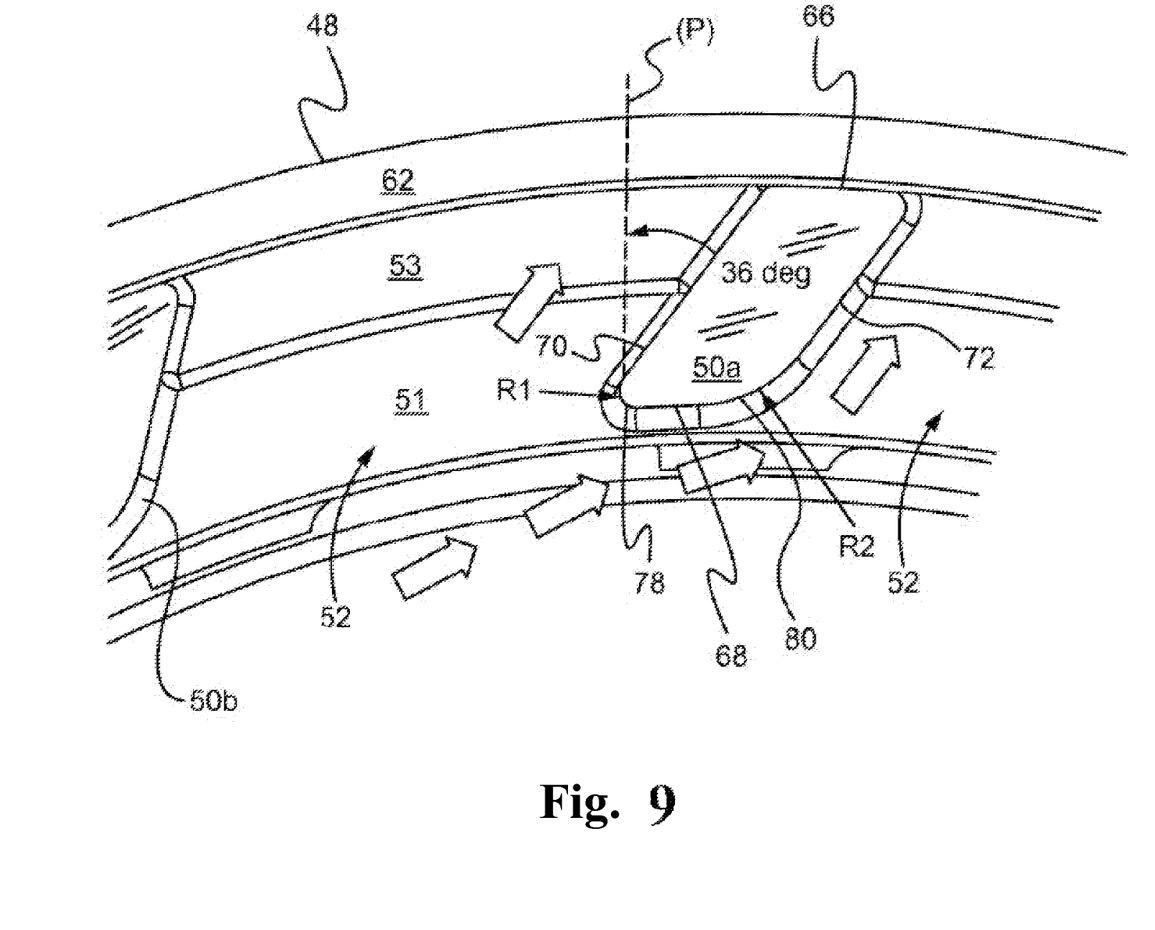
FIG. 9 is a cross sectional view of the air bleed system of FIG. 7 taken along line 9-9.

FIG. 9 is a cross sectional view of the bleed case 44 of FIG. 7 taken along line 9-9. From this view it can be seen that each ligament 50 has an arced top face 66 defining an outer diameter (OD), a similarly arced bottom face 68 defining an inner diameter (ID), a first substantially planar end face 70 and a second substantially planar end face 72. Each ligament 50 extends between and adjoins the forward and aft sections 46, 48 of the bleed case 44. Only aft section 48 is shown in FIG. 9.

The view shown in FIG. 9 may be thought of as a cross-section of the bleed case 44 taken along a transverse plane, i.e., a plane normal to the engine longitudinal axis (A) (shown in FIG. 1) and intersecting the axis (A) between the forward and aft sections 46, 48 of the bleed case 44. When viewed from this perspective, it becomes clear that the first and second faces 70, 72 of each ligament 50 are angled to match as closely as practicable the angle of the swirling air coming off the low pressure compressor 20 (indicated by the arrows in FIG. 9). In other words, the first and second faces 70, 72 are milled at an angle to define planes running substantially parallel to the flow of air coming off the low pressure rotor to minimize loss of air flow through the bleed ports 52.

The angle assumed by the first and second faces 70, 72 may be any angle that matches the direction of air flow or maximizes air flow through the bleed ports 52. For, example, in the illustrated embodiment in FIG. 9 the ligament first face 70 forms an included acute angle of 36 degrees with a longitudinal plane (P), i.e. a plane coincident with the engine longitudinal axis (A). Likewise, the ligament second face 72 forms a 36 degree angle with the longitudinal plane (P).

Still referring to FIG. 9, the lower first edge 78 of the ligament 50, located at the juncture of the first face 70 and the bottom face 68, and the lower second edge 80 of the ligament 50, located at the juncture of the second face 72 and the bottom face 68, may be rounded to minimize air flow disturbances and thus optimize air flow past the ligaments 50. For example, in the illustrated embodiment the ratio of the curvature (R1) of the lower first edge 78 to the curvature (R2) of the lower second edge 80 is 0.125 to 1.00.

The size of the ligaments 50 is a function of a number of factors, including their required structural strength and the required bleed port area (air passage area) under all expected operations. For example, the total bleed area for the illustrated bleed case 44 is 45 square inches, defined as the sum of the areas of the bleed port inlets. The width of the ligament shown in FIG. 9 is about 0.930 inches as measured along a line normal to the first and second surfaces 70, 72, but could vary according to need.

While the invention above has been described as having fifteen ligaments, each angled at 36 degrees from a longitudinal plane, it should be understood that the number, height, length and width of the ligaments, as well as the angle cut, may be varied according to need. The number and dimensions of the ligaments needs to be aerodynamically or acoustically tuned to the other adjacent hardware in the compressor to minimize excitations and vibrations.

Applications

The air bleed system 40 and bleed case 44 of the present invention may be used in commercial jet engines equipped with multistage compressors. The air bleed system 40 and bleed case 44 preferably is located in the low pressure chamber 22 at station 2.5 and is designed to result in minimal flow disturbance to the LPC and no discernible effect to LPC aerodynamic metrics.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. An air bleed system for a jet engine having a low pressure compressor chamber, a low pressure compressor, a low pressure rotor which generates swirling air that impinges on the air bleed system at an angle thereto, an engine core inlet, a fan duct, a combustion chamber and a longitudinal axis, the air bleed system comprising:
a stationary bleed case having a forward section, an aft section, and ligaments extending from an inner wall of the forward section to an inner wall of the aft section connecting the forward section and the aft section, wherein the forward section, the aft section and the ligaments together define a series of bleed ports circumferentially disposed around the stationary bleed case and configured to bleed a portion of the swirling air generated by the low pressure rotor from the engine core inlet into the fan duct;
a bleed valve connected to the stationary bleed case and configured to open and close the series of bleed ports, the series of bleed ports located between the longitudinal axis and the bleed valve, wherein each bleed port of the series of bleed ports has an angular shape and includes an angled section angled obliquely relative to the longitudinal axis and a radial section extending continuously from the angled section, the angled section further oriented at an oblique angle to a plane defined by the stationary bleed case, wherein the angled section and the radial section are joined at a bend; and
wherein each of the ligaments comprises:
an arced top face on a first side facing the fan duct, an arced bottom face on a second side facing the engine core inlet, a first end face extending from the arced top face to the arced bottom face and a second end face opposite the first end face, a first lower edge located at a juncture of the first end face and the arced bottom face, the first lower edge having a first curvature, a second lower edge located at a juncture of the second end face and the arced bottom face, the second lower edge having a second curvature greater than the first curvature to minimize airflow disturbances.

2. The air bleed system of claim 1 in which the first end face and the second end face of each ligament are angled to maximize airflow through the series of bleed ports.

3. The air bleed system of claim 1 in which the first end face and the second end face of each ligament are constructed to extend parallel to a flow direction of the portion of the swirling air generated by the low pressure rotor.

4. The air bleed system of claim 1 in which the bleed valve comprises an annular body carrying a first set of seals and a second set of seals arranged circumferentially around the annular body, the bleed valve being movable between a closed position wherein the first set of seals and the second set of seals engage the stationary bleed case to close the series of bleed ports and an open position wherein the first set of seals and the second set of seals are disengaged from the stationary bleed case to open the series of bleed ports.

5. The air bleed system of claim 4 in which the bleed valve is mounted to the stationary bleed case.

6. The air bleed system of claim 4 in which the bleed valve is configured to be moved to the open position when an amount of air required by the combustion chamber is less than an amount of air flowing through the low pressure compressor chamber.

7. The air bleed system of claim 1 in which the ligaments are milled from the stationary bleed case.

8. The air bleed system of claim 1 in which the jet engine comprises an air intake port upstream of the low pressure compressor chamber and a high pressure compressor chamber located downstream of the low pressure compressor chamber, and in which the air bleed system is located in the low pressure compressor chamber.

9. The air bleed system of claim 1 in which the low pressure compressor chamber has a forward portion and an aft portion and wherein the air bleed system is located in the aft portion of the low pressure compressor chamber.

10. The air bleed system of claim 1 in which the bleed valve is positioned upstream of the stationary bleed case and is movable in an axial direction between a closed position wherein the bleed valve seals the series of bleed ports and an open position wherein the portion of the swirling air can pass through the series of bleed ports into the fan duct.

11. The air bleed system of claim 1 in which the air bleed system is located longitudinally behind a rotating low pressure compressor blade with respect to the longitudinal axis.

12. The air bleed system of claim 1 in which each ligament comprises an angled section and a radially extending section, the angled section of each ligament oriented at an oblique angle to the plane defined by the stationary bleed case, the radially extending section of each ligament extending parallel to the plane defined by the stationary bleed case.

* * * * *